United States Patent
Han et al.

(10) Patent No.: US 10,142,647 B2
(45) Date of Patent: Nov. 27, 2018

(54) ALTERNATING BLOCK CONSTRAINED DECISION MODE CODING

(71) Applicant: Google Inc., Mountain View, CA (US)

(72) Inventors: Jingning Han, Santa Clara, CA (US); Yaowu Xu, Saratoga, CA (US)

(73) Assignee: GOOGLE LLC, Mountain View, CA (US)

(*) Notice: Subject to any disclaimer, the term of this patent is extended or adjusted under 35 U.S.C. 154(b) by 815 days.

(21) Appl. No.: 14/540,083

(22) Filed: Nov. 13, 2014

(65) Prior Publication Data

US 2016/0142726 A1    May 19, 2016

(51) Int. Cl.
| | |
|---|---|
| H04N 19/503 | (2014.01) |
| H04N 19/82 | (2014.01) |
| H04N 19/176 | (2014.01) |
| H04N 19/103 | (2014.01) |
| H04N 19/136 | (2014.01) |
| H04N 19/157 | (2014.01) |

(52) U.S. Cl.
CPC ......... *H04N 19/503* (2014.11); *H04N 19/103* (2014.11); *H04N 19/136* (2014.11); *H04N 19/157* (2014.11); *H04N 19/176* (2014.11); *H04N 19/82* (2014.11)

(58) Field of Classification Search
None
See application file for complete search history.

(56) References Cited

U.S. PATENT DOCUMENTS

| | | | |
|---|---|---|---|
| 5,050,230 A | 9/1991 | Jones et al. | |
| 5,617,541 A | 4/1997 | Albanese et al. | |
| 6,778,553 B1 | 8/2004 | Chou | |
| 6,847,684 B1 | 1/2005 | Hsu | |
| 7,509,553 B2 | 3/2009 | Fuldseth | |

(Continued)

FOREIGN PATENT DOCUMENTS

| | | |
|---|---|---|
| WO | 20051055612 | 6/2005 |
| WO | WO2010146496 | 12/2010 |

OTHER PUBLICATIONS

Hsiang, Shi-ta et al.: "Embedded Image Coding Using Zeroblocks of Subband/wavelet Coefficients and Context Modeling", IEEE Int. Conf. on Circuits and Systems, vol. 3, ISCAS2000, MPEG-4 Workshop and Exhibition atISCAS 2000, Switzerland, May 2000, all pages.

(Continued)

*Primary Examiner* — Kaitlin A Retallick
(74) *Attorney, Agent, or Firm* — Young Basile Hanlon & MacFarlane, P.C.

(57) ABSTRACT

A method and apparatus for video coding using alternating block constrained decision mode coding is provided. Video coding using alternating block constrained decision mode coding may include identifying a current block of a current frame of an input video stream, generating an encoded block by encoding the current block using alternating block constrained decision mode coding, wherein alternating block constrained decision mode coding includes encoding the current block as a constrained decision mode coded block on a condition that a previously coded immediately adjacent block is an unconstrained decision mode coded block, including the encoded block in an output bitstream, and transmitting or storing the output bitstream.

17 Claims, 8 Drawing Sheets

(56) References Cited

U.S. PATENT DOCUMENTS

| | | | |
|---|---|---|---|
| 7,847,861 | B2 | 12/2010 | Zhai et al. |
| 8,467,448 | B2 | 6/2013 | Hsiang et al. |
| 8,582,904 | B2 | 11/2013 | Yu et al. |
| 8,767,816 | B2 | 7/2014 | Choi |
| 8,774,272 | B1* | 7/2014 | Chen .................. H04N 7/50 375/240.12 |
| 8,942,283 | B2 | 1/2015 | Pace |
| 2005/0201627 | A1* | 9/2005 | Liang ............... H04N 19/197 382/239 |
| 2005/0232501 | A1 | 10/2005 | Mukerjee |
| 2006/0013313 | A1 | 1/2006 | Han et al. |
| 2006/0159173 | A1 | 7/2006 | Ye et al. |
| 2006/0165304 | A1 | 7/2006 | Lee et al. |
| 2006/0193386 | A1 | 8/2006 | Lin |
| 2006/0256868 | A1 | 11/2006 | Westerman |
| 2007/0047644 | A1 | 3/2007 | Lee et al. |
| 2008/0013630 | A1 | 1/2008 | Li et al. |
| 2008/0181308 | A1 | 7/2008 | Wang et al. |
| 2010/0142761 | A1 | 6/2010 | Venkatapuram et al. |
| 2011/0249743 | A1 | 10/2011 | Zhao et al. |
| 2013/0051461 | A1 | 2/2013 | Chiu et al. |
| 2013/0094572 | A1* | 4/2013 | Van der Auwera ..................... H04N 19/00096 375/240.03 |
| 2013/0259118 | A1* | 10/2013 | Fu .................. H04N 19/169 375/240.02 |
| 2014/0044162 | A1* | 2/2014 | Guo ............... H04N 19/00151 375/240.02 |
| 2014/0044164 | A1 | 2/2014 | Gu et al. |

OTHER PUBLICATIONS

Lengwehasatit, K. and A. Ortega, "Rate-complexity-distortion optimization for quadtree-based DCT coding," in Proc. IEEE Int. Conf. Image Processing Vancouver, BC, Canada, 2000.
Bankoski et al. "Technical Overview of VP8, an Open Source Video Codec for the Web". Dated Jul. 11, 2011.
Bankoski et al. "VP8 Data Format and Decoding Guide" Independent Submission. RFC 6389, Dated Nov. 2011.
Bankoski et al. "VP8 Data Format and Decoding Guide; draft-bankoski-vp8-bitstream-02" Network Working Group. Internet-Draft, May 18, 2011, 288 pp.
Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.
Mozilla, "Introduction to Video Coding Part 1: Transform Coding", Video Compression Overview, Mar. 2012, 171 pp.
Overview; VP7 Data Format and Decoder. Version 1.5. On2 Technologies, IxNC. Dated Mar. 28, 2005.
Series H: Audiovisual and Multimedia Systems; Infrastructure of audiovisual services—Coding of moving video. H.264. Advanced video coding for generic audiovisual services. International Telecommunication Union. Version 11. Dated Mar. 2009.
Series H: Audiovisual and Multimedia Systems; Infrastructure of audiovisual services—Coding of moving video. H.264. Advanced video coding for generic audiovisual services. International Telecommunication Union. Version 12. Dated Mar. 2010.
Series H: Audiovisual and Multimedia Systems; Infrastructure of audiovisual services—Coding of moving video. H.264. Amendment 2: New profiles for professional applications. International Telecommunication Union. Dated Apr. 2007.
Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.
Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.
Series H: Audiovisual and Multimedia Systems; Infrastructure of audiovisual services—Coding of moving video; Advanced video coding for generic audiovisual services. H.264. Version 1. International Telecommunication Union. Dated May 2003.
Series H: Audiovisual and Multimedia Systems; Infrastructure of audiovisual services—Coding of moving video; Advanced video coding for generic audiovisual services. H.264. Version 3. International Telecommunication Union. Dated Mar. 2005.
VP6 Bitstream & Decoder Specification. Version 1.02. On2 Technologies, IxNC. Dated Aug. 17, 2006.
VP6 Bitstream & Decoder Specification. Version 1.03. On2 Technologies, IxNC. Dated Oct. 29, 2007.
VP8 Data Format and Decoding Guide. WebM Project. Google On2. Dated: Dec. 1, 2010.
Stefaan Mys et al.: "Dynamic Complexity Coding: Combining Predictive and Distributed Video Coding (Abstrac)" 26, Picture Coding Symposium; Jul. 11, 2007, Lisbon, p. 2.
International Search Report and the Written Opinion of the International Searching Authority for International Application No. PCT/US2015/059547, dated Jan. 22, 2016, 24 pages.

\* cited by examiner

ALTERNATING BLOCK CONSTRAINED DECISION MODE CODING

BACKGROUND

Digital video can be used, for example, for remote business meetings via video conferencing, high definition video entertainment, video advertisements, or sharing of user-generated videos. Due to the large amount of data involved in video data, high performance compression is needed for transmission and storage. Accordingly, it would be advantageous to provide high resolution video transmitted over communications channels having limited bandwidth.

SUMMARY

This application relates to encoding and decoding of video stream data for transmission or storage. Disclosed herein are aspects of systems, methods, and apparatuses for encoding and decoding using alternating block constrained decision mode coding.

An aspect is a method for video coding using alternating block constrained decision mode coding. Video coding using alternating block constrained decision mode coding may include identifying a current block of a current frame of an input video stream, generating an encoded block by encoding the current block using alternating block constrained decision mode coding, wherein alternating block constrained decision mode coding includes encoding the current block as a constrained decision mode coded block on a condition that a previously coded immediately adjacent block is an unconstrained decision mode coded block, including the encoded block in an output bitstream, and transmitting or storing the output bitstream Another aspect is a method for video coding using alternating block constrained decision mode coding. In some implementations, video coding using alternating block constrained decision mode coding may include identifying a current block of a current frame of an input video stream, and generating an encoded block by encoding the current block using alternating block constrained decision mode coding, wherein alternating block constrained decision mode coding includes encoding the current block as a constrained decision mode coded block on a condition that a first previously coded immediately adjacent block is an unconstrained decision mode coded block and a second previously coded immediately adjacent block is an unconstrained decision mode coded block. In some implementations, video coding using alternating block constrained decision mode coding may include including the encoded block in an output bitstream, and transmitting or storing the output bitstream.

Another aspect is a method for video coding using alternating block constrained decision mode coding. In some implementations, video coding using alternating block constrained decision mode coding may include identifying a current block of a current frame of an input video stream, and generating, by a processor in response to instructions stored on a non-transitory computer readable medium, an encoded block by encoding the current block using alternating block constrained decision mode coding. In some implementations, using alternating block constrained decision mode coding may include encoding the current block as a constrained decision mode coded block on a condition that a first previously coded immediately adjacent block is an unconstrained decision mode coded block, wherein the first previously coded immediately adjacent block is a previously coded block spatially immediately to the left of the current block in the current frame, a second previously coded immediately adjacent block is an unconstrained decision mode coded block, wherein the second previously coded immediately adjacent block is a previously coded block spatially immediately above the current block in the current frame, and a third previously coded immediately adjacent block is an unconstrained decision mode coded block, wherein the third previously coded immediately adjacent block is spatially concurrent with the current block and the third previously coded immediately adjacent block is from a temporally immediately adjacent previously coded frame. In some implementations, video coding using alternating block constrained decision mode coding may include encoding the current block using a prediction filter identified based on the first previously coded immediately adjacent block and the second previously coded immediately adjacent block. In some implementations, video coding using alternating block constrained decision mode coding may include encoding the current block using a coding block size range identified block based on the first previously coded immediately adjacent block, the second previously coded immediately adjacent block, and the third previously coded immediately adjacent block. In some implementations, video coding using alternating block constrained decision mode coding may include including the encoded block in an output bitstream, and transmitting or storing the output bitstream.

Variations in these and other aspects will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Digital video may be used for various purposes including, for example, remote business meetings via video conferencing, high definition video entertainment, video advertisements, and sharing of user-generated videos. Digital video streams may represent video using a sequence of frames or images. Each frame can include a number of blocks, which may include information indicating pixel attributes, such as color values or brightness. Transmission and storage of video can use significant computing or communications resources. Compression and other coding techniques may be used to reduce the amount of data in video streams.

Encoding a video stream, or a portion thereof, such as a frame or a block, can include using temporal and spatial similarities in the video stream to improve coding efficiency. For example, video coding may include predicting pixel values based on temporal and spatial similarities between pixels. In some implementations, video coding may include block-based coding, in which a frame may be divided into a grid or matrix of blocks, and each block may be coded as a unit. Coding a block may include evaluating many candidate coding modes, such as intra-coding and inter-coding modes, to identify the optimal coding mode, which may be the coding mode that minimizes an error metric, such as a rate-distortion metric. In some implementations, evaluating multiple candidate coding modes may utilize significant resources, may increase complexity, and may ignore inter-block coding mode correlation.

In some implementations, video coding may include using alternating block constrained decision mode coding. Alternating block constrained decision mode coding may include using inter-block coding mode correlation to reduce complexity and increase coding efficiency. For example, alternating block constrained decision mode coding may include alternating, on a block basis, between an unconstrained coding mode search and a constrained context adaptive coding mode search. In some implementations, alternating block constrained decision mode coding may include coding a current block from a current frame based on one or more spatially and temporally adjacent blocks. In some implementations, alternating block constrained decision mode coding may include coding identifying a prediction filter for generating a motion compensated prediction block for encoding the current block. In some implementations, alternating block constrained decision mode coding may include identifying a coding block size range for encoding the current block.

Figure 1:
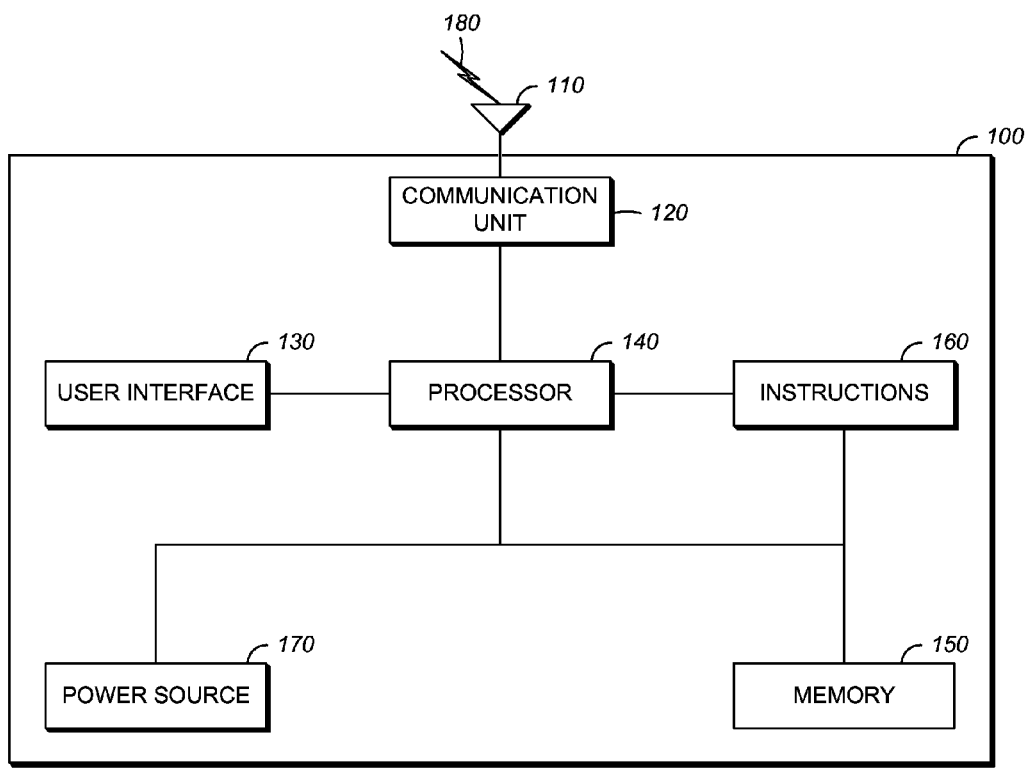
FIG. 1 is a diagram of a computing device in accordance with implementations of this disclosure.

FIG. 1 is a diagram of a computing device 100 in accordance with implementations of this disclosure. A computing device 100 can include a communication interface 110, a communication unit 120, a user interface (UI) 130, a processor 140, a memory 150, instructions 160, a power source 170, or any combination thereof. As used herein, the term "computing device" includes any unit, or combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one or more element of the communication device 100 can be integrated into any number of separate physical units. For example, the UI 130 and processor 140 can be integrated in a first physical unit and the memory 150 can be integrated in a second physical unit.

The communication interface 110 can be a wireless antenna, as shown, a wired communication port, such as an Ethernet port, an infrared port, a serial port, or any other wired or wireless unit capable of interfacing with a wired or wireless electronic communication medium 180.

The communication unit 120 can be configured to transmit or receive signals via a wired or wireless medium 180. For example, as shown, the communication unit 120 is operatively connected to an antenna configured to communicate via wireless signals. Although not explicitly shown in FIG. 1, the communication unit 120 can be configured to transmit, receive, or both via any wired or wireless communication medium, such as radio frequency (RF), ultra violet (UV), visible light, fiber optic, wire line, or a combination thereof. Although FIG. 1 shows a single communication unit 120 and a single communication interface 110, any number of communication units and any number of communication interfaces can be used.

The UI 130 can include any unit capable of interfacing with a user, such as a virtual or physical keypad, a touchpad, a display, a touch display, a speaker, a microphone, a video camera, a sensor, or any combination thereof. The UI 130 can be operatively coupled with the processor, as shown, or with any other element of the communication device 100, such as the power source 170. Although shown as a single unit, the UI 130 may include one or more physical units. For example, the UI 130 may include an audio interface for performing audio communication with a user, and a touch display for performing visual and touch based communication with the user. Although shown as separate units, the communication interface 110, the communication unit 120, and the UI 130, or portions thereof, may be configured as a combined unit. For example, the communication interface 110, the communication unit 120, and the UI 130 may be implemented as a communications port capable of interfacing with an external touchscreen device.

The processor 140 can include any device or system capable of manipulating or processing a signal or other information now-existing or hereafter developed, including optical processors, quantum processors, molecular processors, or a combination thereof. For example, the processor 140 can include a general purpose processor, a special purpose processor, a conventional processor, a digital signal processor (DSP), a plurality of microprocessors, one or more microprocessor in association with a DSP core, a controller, a microcontroller, an Application Specific Integrated Circuit (ASIC), a Field Programmable Gate Array (FPGA), a programmable logic array, programmable logic controller, microcode, firmware, any type of integrated circuit (IC), a state machine, or any combination thereof. As used herein, the term "processor" includes a single processor or multiple processors. The processor can be operatively coupled with the communication interface 110, communication unit 120, the UI 130, the memory 150, the instructions 160, the power source 170, or any combination thereof.

The memory 150 can include any non-transitory computer-usable or computer-readable medium, such as any tangible device that can, for example, contain, store, communicate, or transport the instructions 160, or any information associated therewith, for use by or in connection with the processor 140. The non-transitory computer-usable or computer-readable medium can be, for example, a solid state drive, a memory card, removable media, a read only memory (ROM), a random access memory (RAM), any type of disk including a hard disk, a floppy disk, an optical disk, a magnetic or optical card, an application specific integrated circuits (ASICs), or any type of non-transitory media suitable for storing electronic information, or any combination thereof. The memory 150 can be connected to, for example, the processor 140 through, for example, a memory bus (not explicitly shown).

The instructions 160 can include directions for performing any method, or any portion or portions thereof, disclosed herein. The instructions 160 can be realized in hardware, software, or any combination thereof. For example, the instructions 160 may be implemented as information stored in the memory 150, such as a computer program, that may be executed by the processor 140 to perform any of the respective methods, algorithms, aspects, or combinations thereof, as described herein. The instructions 160, or a portion thereof, may be implemented as a special purpose processor, or circuitry, that can include specialized hardware for carrying out any of the methods, algorithms, aspects, or combinations thereof, as described herein. Portions of the instructions 160 can be distributed across multiple processors on the same machine or different machines or across a network such as a local area network, a wide area network, the Internet, or a combination thereof.

The power source 170 can be any suitable device for powering the communication device 110. For example, the power source 170 can include a wired power source; one or more dry cell batteries, such as nickel-cadmium (NiCd), nickel-zinc (NiZn), nickel metal hydride (NiMH), lithium-ion (Li-ion); solar cells; fuel cells; or any other device capable of powering the communication device 110. The communication interface 110, the communication unit 120, the UI 130, the processor 140, the instructions 160, the memory 150, or any combination thereof, can be operatively coupled with the power source 170.

Although shown as separate elements, the communication interface 110, the communication unit 120, the UI 130, the processor 140, the instructions 160, the power source 170, the memory 150, or any combination thereof can be integrated in one or more electronic units, circuits, or chips.

Figure 2:
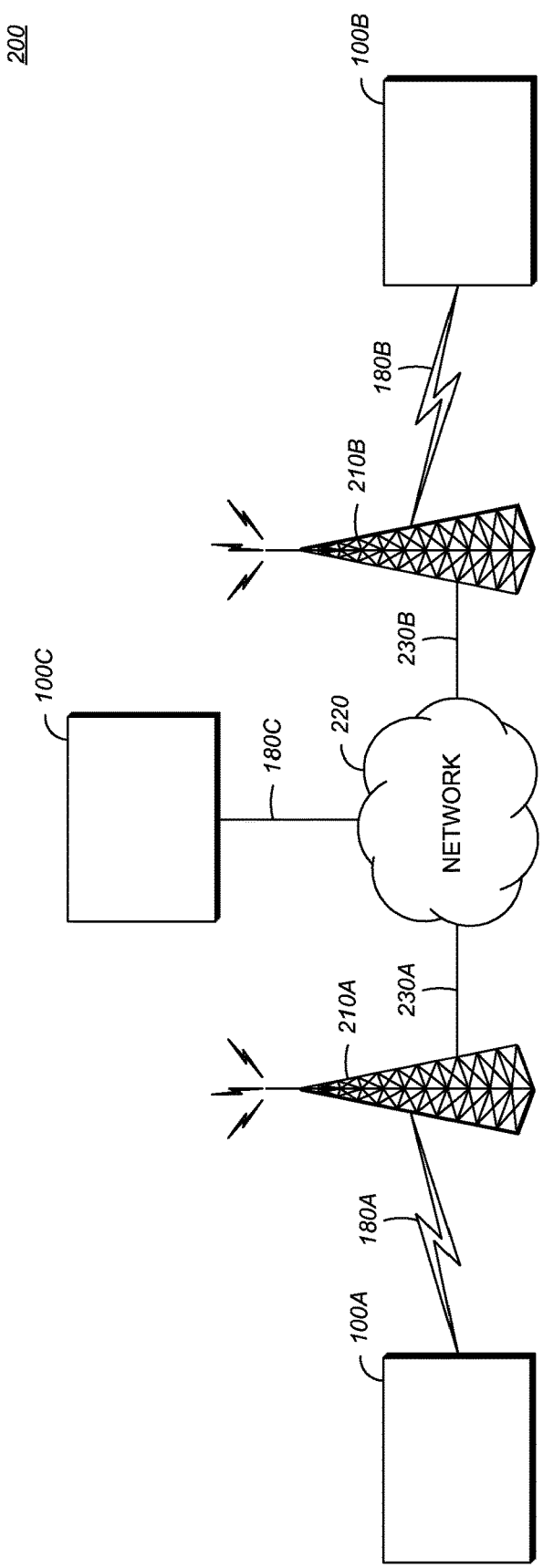
FIG. 2 is a diagram of a computing and communications system in accordance with implementations of this disclosure.

FIG. 2 is a diagram of a computing and communications system 200 in accordance with implementations of this disclosure. The computing and communications system 200 may include one or more computing and communication devices 100A/100B/100C, one or more access points 210A/210B, one or more networks 220, or a combination thereof. For example, the computing and communication system 200 can be a multiple access system that provides communication, such as voice, data, video, messaging, broadcast, or a combination thereof, to one or more wired or wireless communicating devices, such as the computing and communication devices 100A/100B/100C. Although, for simplicity, FIG. 2 shows three computing and communication devices 100A/100B/100C, two access points 210A/210B, and one network 220, any number of computing and communication devices, access points, and networks can be used.

A computing and communication device 100A/100B/100C can be, for example, a computing device, such as the computing device 100 shown in FIG. 1. For example, as shown the computing and communication devices 100A/100B may be user devices, such as a mobile computing device, a laptop, a thin client, or a smartphone, and computing and the communication device 100C may be a server, such as a mainframe or a cluster. Although the computing and communication devices 100A/100B are described as user devices, and the computing and communication device 100C is described as a server, any computing and communication device may perform some or all of the functions of a server, some or all of the functions of a user device, or some or all of the functions of a server and a user device.

Each computing and communication device 100A/100B/100C can be configured to perform wired or wireless communication. For example, a computing and communication device 100A/100B/100C can be configured to transmit or receive wired or wireless communication signals and can include a user equipment (UE), a mobile station, a fixed or mobile subscriber unit, a cellular telephone, a personal computer, a tablet computer, a server, consumer electronics, or any similar device. Although each computing and communication device 100A/100B/100C is shown as a single unit, a computing and communication device can include any number of interconnected elements.

Each access point 210A/210B can be any type of device configured to communicate with a computing and communication device 100A/100B/100C, a network 220, or both via wired or wireless communication links 180A/180B/180C. For example, an access point 210A/210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A/210B is shown as a single unit, an access point can include any number of interconnected elements.

The network 220 can be any type of network configured to provide services, such as voice, data, applications, voice over internet protocol (VoIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the transmission control protocol (TCP), the user datagram protocol (UDP), the internet protocol (IP), the real-time transport protocol (RTP) the Hyper Text Transport Protocol (HTTP), or a combination thereof.

The computing and communication devices 100A/100B/100C can communicate with each other via the network 220 using one or more a wired or wireless communication links, or via a combination of wired and wireless communication links. For example, as shown the computing and communication devices 100A/100B can communicate via wireless communication links 180A/180B, and computing and communication device 100C can communicate via a wired communication link 180C. Any of the computing and communication devices 100A/100B/100C may communicate using any wired or wireless communication link, or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A/210B can communicate with the network 220 via one or more types of wired or wireless communication links 230A/230B. Although FIG. 2 shows the computing and communication devices 100A/100B/100C in communication via the network 220, the computing and communication devices 100A/100B/100C can communicate with each other via any number of communication links, such as a direct wired or wireless communication link.

Other implementations of the computing and communications system 200 are possible. For example, in an implementation the network 220 can be an ad-hock network and can omit one or more of the access points 210A/210B. The computing and communications system 200 may include devices, units, or elements not shown in FIG. 2. For example, the computing and communications system 200 may include many more communicating devices, networks, and access points.

Figure 3:
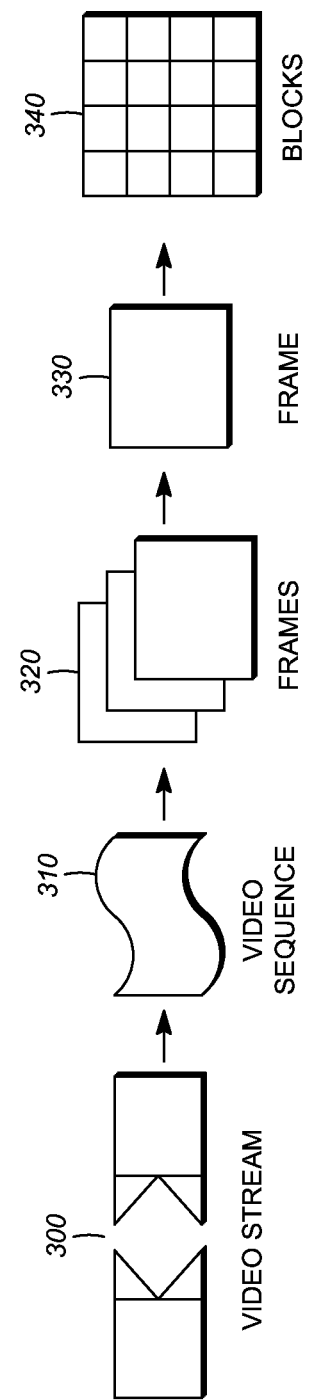
FIG. 3 is a diagram of a video stream for use in encoding and decoding in accordance with implementations of this disclosure.

FIG. 3 is a diagram of a video stream 300 for use in encoding and decoding in accordance with implementations of this disclosure. A video stream 300, such as a video stream captured by a video camera or a video stream generated by a computing device, may include a video sequence 310. The video sequence 310 may include a sequence of adjacent frames 320. Although three adjacent frames 320 are shown, the video sequence 310 can include any number of adjacent frames 320. Each frame 330 from the adjacent frames 320 may represent a single image from the video stream. A frame 330 may include blocks 340. Although not shown in FIG. 3, a block can include pixels. For example, a block can include a 16×16 group of pixels, an 8×8 group of pixels, an 8×16 group of pixels, or any other group of pixels. Unless otherwise indicated herein, the term 'block' can include a superblock, a macroblock, a segment, a slice, or any other portion of a frame. A frame, a block, a pixel, or a combination thereof can include display information, such as luminance information, chrominance information, or any other information that can be used to store, modify, communicate, or display the video stream or a portion thereof.

Figure 4:
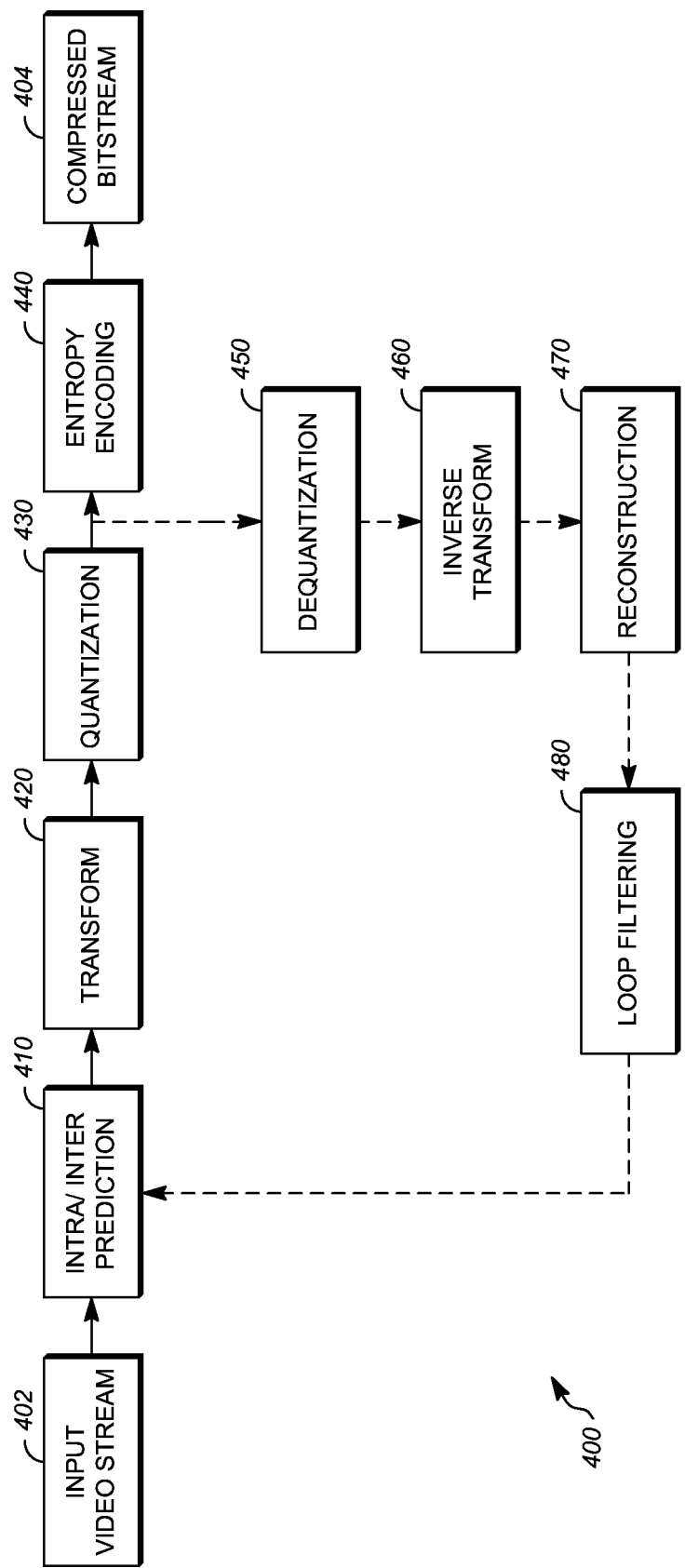
FIG. 4 is a block diagram of an encoder in accordance with implementations of this disclosure.

FIG. 4 is a block diagram of an encoder 400 in accordance with implementations of this disclosure. Encoder 400 can be implemented in a device, such as the computing device 100 shown in FIG. 1 or the computing and communication devices 100A/100B/100C shown in FIG. 2, as, for example, a computer software program stored in a data storage unit, such as the memory 150 shown in FIG. 1. The computer software program can include machine instructions that may be executed by a processor, such as the processor 160 shown in FIG. 1, and may cause the device to encode video data as described herein. The encoder 400 can be implemented as specialized hardware included, for example, in computing device 100.

The encoder 400 can encode an input video stream 402, such as the video stream 300 shown in FIG. 3 to generate an encoded (compressed) bitstream 404. In some implementations, the encoder 400 may include a forward path for generating the compressed bitstream 404. The forward path may include an intra/inter prediction unit 410, a transform unit 420, a quantization unit 430, an entropy encoding unit 440, or any combination thereof. In some implementations, the encoder 400 may include a reconstruction path (indicated by the broken connection lines) to reconstruct a frame for encoding of further blocks. The reconstruction path may include a dequantization unit 450, an inverse transform unit 460, a reconstruction unit 470, a loop filtering unit 480, or any combination thereof. Other structural variations of the encoder 400 can be used to encode the video stream 402.

For encoding the video stream 402, each frame within the video stream 402 can be processed in units of blocks. Thus, a current block may be identified from the blocks in a frame, and the current block may be encoded.

At the intra/inter prediction unit 410, the current block can be encoded using either intra-frame prediction, which may be within a single frame, or inter-frame prediction, which may be from frame to frame. Intra-prediction may include generating a prediction block from samples in the current frame that have been previously encoded and reconstructed. Inter-prediction may include generating a prediction block from samples in one or more previously constructed reference frames. Generating a prediction block for a current block in a current frame may include performing motion estimation to generate a motion vector indicating an appropriate reference block in the reference frame.

The intra/inter prediction unit 410 may subtract the prediction block from the current block (raw block) to produce a residual block. The transform unit 420 may perform a block-based transform, which may include transforming the residual block into transform coefficients in, for example, the frequency domain. Examples of block-based transforms include the Karhunen-Loève Transform (KLT), the Discrete Cosine Transform (DCT), and the Singular Value Decomposition Transform (SVD). In an example, the DCT may include transforming a block into the frequency domain. The DCT may include using transform coefficient values based on spatial frequency, with the lowest frequency (i.e. DC) coefficient at the top-left of the matrix and the highest frequency coefficient at the bottom-right of the matrix.

The quantization unit 430 may convert the transform coefficients into discrete quantum values, which may be referred to as quantized transform coefficients or quantization levels. The quantized transform coefficients can be entropy encoded by the entropy encoding unit 440 to produce entropy-encoded coefficients. Entropy encoding can include using a probability distribution metric. The entropy-encoded coefficients and information used to decode the block, which may include the type of prediction used, motion vectors, and quantizer values, can be output to the compressed bitstream 404. The compressed bitstream 404 can be formatted using various techniques, such as run-length encoding (RLE) and zero-run coding.

Figure 5:
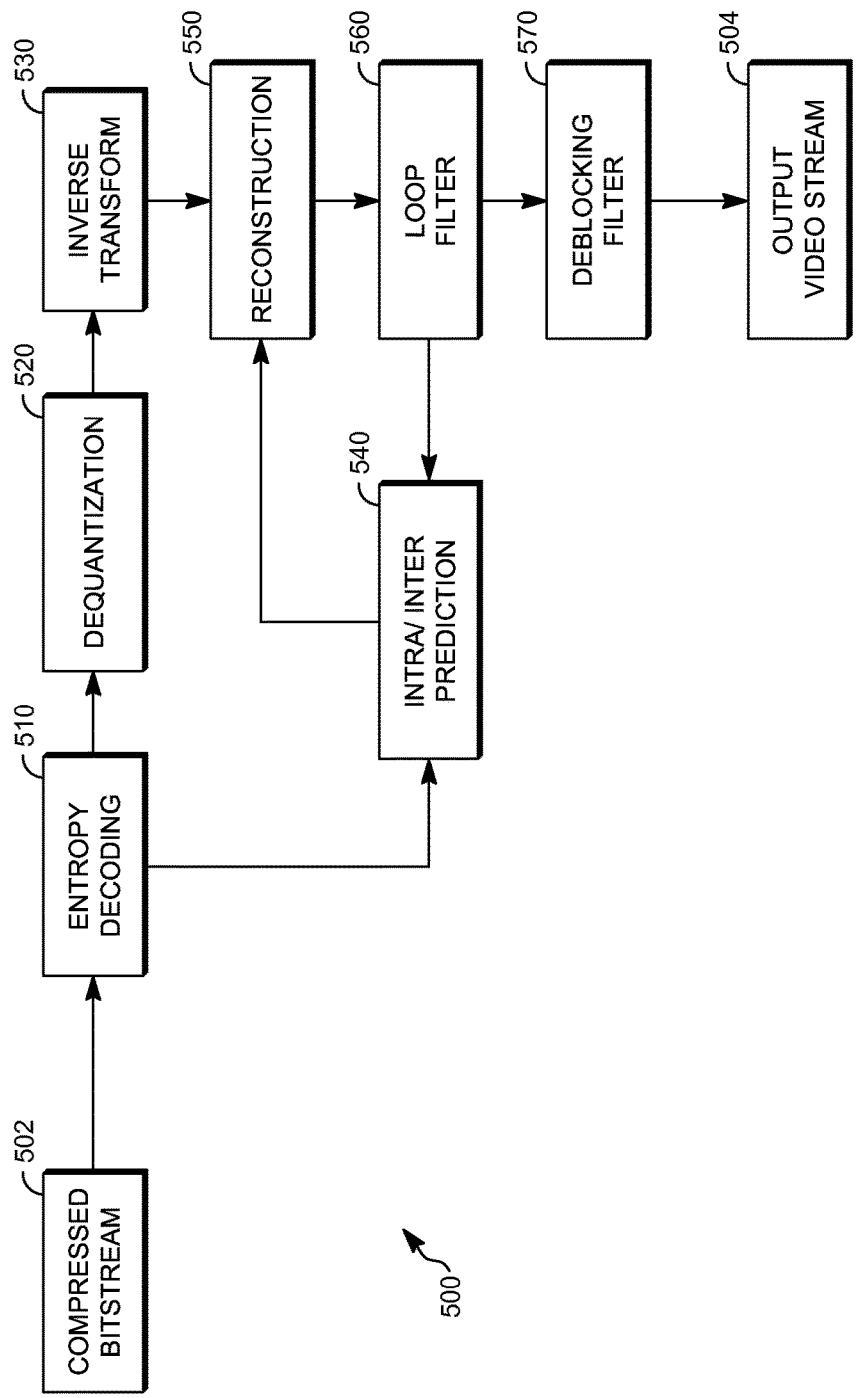
FIG. 5 is a block diagram of a decoder in accordance with implementations of this disclosure.

The reconstruction path can be used to maintain reference frame synchronization between the encoder 400 and a corresponding decoder, such as the decoder 500 shown in FIG. 5. The reconstruction path may be similar to the decoding process discussed below, and may include dequantizing the quantized transform coefficients at the dequantization unit 450 and inverse transforming the dequantized transform coefficients at the inverse transform unit 460 to produce a derivative residual block. The reconstruction unit 470 may add the prediction block generated by the intra/inter prediction unit 410 to the derivative residual block to create a reconstructed block. The loop filtering unit 480 can be applied to the reconstructed block to reduce distortion, such as blocking artifacts.

Other variations of the encoder 400 can be used to encode the compressed bitstream 404. For example, a non-transform based encoder 400 can quantize the residual block directly without the transform unit 420. In some implementations, the quantization unit 430 and the dequantization unit 450 may be combined into a single unit.

FIG. 5 is a block diagram of a decoder 500 in accordance with implementations of this disclosure. The decoder 500 can be implemented in a device, such as the computing device 100 shown in FIG. 1 or the computing and communication devices 100A/100B/100C shown in FIG. 2, as, for example, a computer software program stored in a data storage unit, such as the memory 150 shown in FIG. 1. The computer software program can include machine instructions that may be executed by a processor, such as the processor 160 shown in FIG. 1, and may cause the device to decode video data as described herein. The decoder 400 can be implemented as specialized hardware included, for example, in computing device 100.

The decoder 500 may receive a compressed bitstream 502, such as the compressed bitstream 404 shown in FIG. 4, and may decode the compressed bitstream 502 to generate an output video stream 504. The decoder 500 may include an entropy decoding unit 510, a dequantization unit 520, an inverse transform unit 530, an intra/inter prediction unit 540, a reconstruction unit 550, a loop filtering unit 560, a deblocking filtering unit 570, or any combination thereof. Other structural variations of the decoder 500 can be used to decode the compressed bitstream 502.

The entropy decoding unit 510 may decode data elements within the compressed bitstream 502 using, for example, Context Adaptive Binary Arithmetic Decoding, to produce a set of quantized transform coefficients. The dequantization unit 520 can dequantize the quantized transform coefficients, and the inverse transform unit 530 can inverse transform the dequantized transform coefficients to produce a derivative residual block, which may correspond with the derivative residual block generated by the inverse transformation unit 460 shown in FIG. 4. Using header information decoded from the compressed bitstream 502, the intra/inter prediction unit 540 may generate a prediction block corresponding to the prediction block created in the encoder 400. At the reconstruction unit 550, the prediction block can be added to the derivative residual block to create a reconstructed block. The loop filtering unit 560 can be applied to the reconstructed block to reduce blocking artifacts. The deblocking filtering unit 570 can be applied to the reconstructed block to reduce blocking distortion, and the result may be output as the output video stream 504.

Other variations of the decoder 500 can be used to decode the compressed bitstream 502. For example, the decoder 500 can produce the output video stream 504 without the deblocking filtering unit 570.

Figure 6:
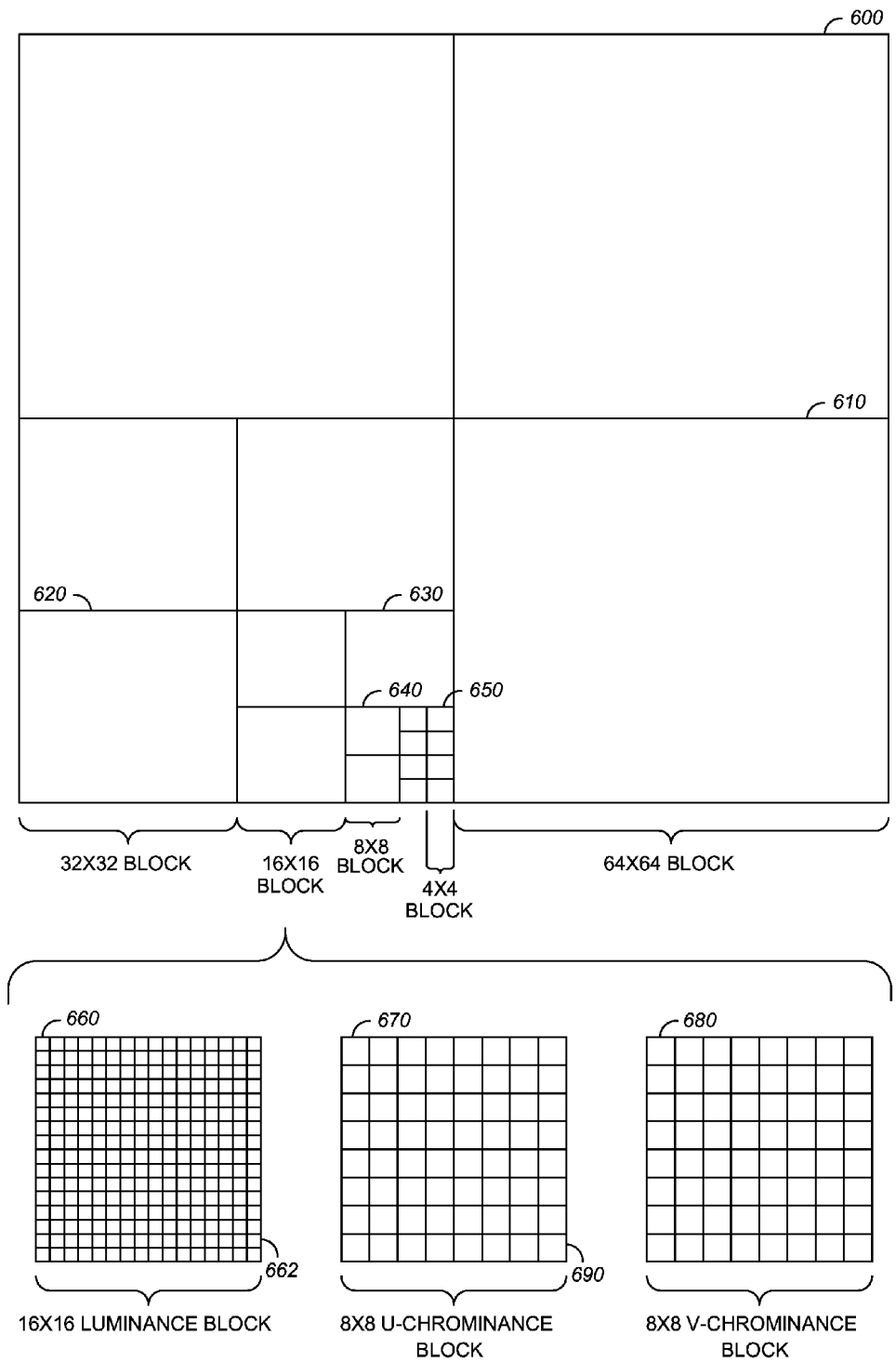
FIG. 6 is a block diagram of a representation of a portion of a frame in accordance with implementations of this disclosure.

FIG. 6 is a block diagram of a representation of a portion 600 of a frame, such as the frame 330 shown in FIG. 3, in accordance with implementations of this disclosure. As shown, the portion 600 of the frame includes four 64×64 blocks 610, in two rows and two columns in a matrix or Cartesian plane. In some implementations, a 64×64 block may be a maximum coding unit, N=64. Each 64×64 block may include four 32×32 blocks 620. Each 32×32 block may include four 16×16 blocks 630. Each 16×16 block may include four 8×8 blocks 640. Each 8×8 block 640 may include four 4×4 blocks 650. Each 4×4 block 650 may include 16 pixels, which may be represented in four rows and four columns in each respective block in the Cartesian plane or matrix. The pixels may include information representing an image captured in the frame, such as luminance information, color information, and location information. In some implementations, a block, such as a 16×16 pixel block as shown, may include a luminance block 660, which may include luminance pixels 662; and two chrominance blocks 670/680, such as a U or Cb chrominance block 670, and a V or Cr chrominance block 680. The chrominance blocks 670/680 may include chrominance pixels 690. For example, the luminance block 660 may include 16×16 luminance pixels 662 and each chrominance block 670/680 may include 8×8 chrominance pixels 690 as shown. Although one arrangement of blocks is shown, any arrangement may be used. Although FIG. 6 shows N×N blocks, in some implementations, N×M blocks may be used. For example, 32×64 blocks, 64×32 blocks, 16×32 blocks, 32×16 blocks, or any other size blocks may be used. In some implementations, N×2N blocks, 2N×N blocks, or a combination thereof may be used.

In some implementations, video coding may include ordered block-level coding. Ordered block-level coding may include coding blocks of a frame in an order, such as raster-scan order, wherein blocks may be identified and processed starting with a block in the upper left corner of the frame, or portion of the frame, and proceeding along rows from left to right and from the top row to the bottom row, identifying each block in turn for processing. For example, the 64×64 block in the top row and left column of a frame may be the first block coded and the 64×64 block immediately to the right of the first block may be the second block coded. The second row from the top may be the second row coded, such that the 64×64 block in the left column of the second row may be coded after the 64×64 block in the rightmost column of the first row.

In some implementations, coding a block may include using quad-tree coding, which may include coding smaller block units within a block in raster-scan order. For example, the 64×64 block shown in the bottom left corner of the portion of the frame shown in FIG. 6, may be coded using quad-tree coding wherein the top left 32×32 block may be coded, then the top right 32×z32 block may be coded, then the bottom left 32×32 block may be coded, and then the bottom right 32×32 block may be coded. Each 32×32 block may be coded using quad-tree coding wherein the top left 16×16 block may be coded, then the top right 16×16 block may be coded, then the bottom left 16×16 block may be coded, and then the bottom right 16×16 block may be coded. Each 16×16 block may be coded using quad-tree coding wherein the top left 8×8 block may be coded, then the top right 8×8 block may be coded, then the bottom left 8×8 block may be coded, and then the bottom right 8×8 block may be coded. Each 8×8 block may be coded using quad-tree coding wherein the top left 4×4 block may be coded, then the top right 4×4 block may be coded, then the bottom left 4×4 block may be coded, and then the bottom right 4×4 block may be coded. In some implementations, 8×8 blocks may be omitted for a 16×16 block, and the 16×16 block may be coded using quad-tree coding wherein the top left 4×4 block may be coded, then the other 4×4 blocks in the 16×16 block may be coded in raster-scan order.

In some implementations, video coding may include compressing the information included in an original, or input, frame by, for example, omitting some of the information in the original frame from a corresponding encoded frame. For example, coding may include reducing spectral redundancy, reducing spatial redundancy, reducing temporal redundancy, or a combination thereof.

In some implementations, reducing spectral redundancy may include using a color model based on a luminance component (Y) and two chrominance components (U and V or Cb and Cr), which may be referred to as the YUV or YCbCr color model, or color space. Using the YUV color model may include using a relatively large amount of information to represent the luminance component of a portion of a frame, and using a relatively small amount of information to represent each corresponding chrominance component for the portion of the frame. For example, a portion of a frame may be represented by a high resolution luminance component, which may include a 16×16 block of pixels, and by two lower resolution chrominance components, each of which represents the portion of the frame as an 8×8 block of pixels. A pixel may indicate a value, for example, a value in the range from 0 to 255, and may be stored or transmitted using, for example, eight bits. Although this disclosure is described in reference to the YUV color model, any color model may be used.

In some implementations, reducing spatial redundancy may include transforming a block into the frequency domain using, for example, a discrete cosine transform (DCT). For example, a unit of an encoder, such as the transform unit 420 shown in FIG. 4, may perform a DCT using transform coefficient values based on spatial frequency.

In some implementations, reducing temporal redundancy may include using similarities between frames to encode a frame using a relatively small amount of data based on one or more reference frames, which may be previously encoded, decoded, and reconstructed frames of the video stream. For example, a block or pixel of a current frame may be similar to a spatially corresponding block or pixel of a reference frame. In some implementations, a block or pixel of a current frame may be similar to block or pixel of a reference frame at a different spatial location, and reducing temporal redundancy may include generating motion information indicating the spatial difference, or translation, between the location of the block or pixel in the current frame and corresponding location of the block or pixel in the reference frame.

In some implementations, reducing temporal redundancy may include identifying a block or pixel in a reference frame, or a portion of the reference frame, that corresponds with a current block or pixel of a current frame. For example, a reference frame, or a portion of a reference frame, which may be stored in memory, may be searched for the best block or pixel to use for encoding a current block or pixel of the current frame. For example, the search may identify the block of the reference frame for which the difference in pixel values between the reference block and the current block is minimized, and may be referred to as motion searching. In some implementations, the portion of the reference frame searched may be limited. For example, the portion of the reference frame searched, which may be referred to as the search area, may include a limited number of rows of the reference frame. In an example, identifying the reference block may include calculating a cost function, such as a sum of absolute differences (SAD), between the pixels of the blocks in the search area and the pixels of the current block.

In some implementations, the spatial difference between the location of the reference block in the reference frame and the current block in the current frame may be represented as a motion vector. The difference in pixel values between the reference block and the current block may be referred to as differential data, residual data, or as a residual block. In some implementations, generating motion vectors may be referred to as motion estimation, a pixel of a current block may be indicated based on location using Cartesian coordinates as $f_{x,y}$. Similarly, a pixel of the search area of the reference frame may be indicated based on location using Cartesian coordinates as $r_{x,y}$. A motion vector (MV) for the current block may be determined based on, for example, a SAD between the pixels of the current frame and the corresponding pixels of the reference frame.

Although motion-compensated partitioning is described herein with reference to matrix or Cartesian representation of a frame for clarity, a frame may be stored, transmitted, processed, or any combination thereof, in any data structure such that pixel values may be efficiently predicted for a frame or image. For example, a frame may be stored, transmitted, processed, or any combination thereof, in a two dimensional data structure such as a matrix as shown, or in a one dimensional data structure, such as a vector array. In an implementation, a representation of the frame, such as a two dimensional representation as shown, may correspond to a physical location in a rendering of the frame as an image. For example, a location in the top left corner of a block in the top left corner of the frame may correspond with a physical location in the top left corner of a rendering of the frame as an image.

In some implementations, the content captured within a block may include two or more areas that exhibit distinct spatial and temporal characteristics. For example, a frame may capture multiple objects moving in various directions and speeds, and a block may include an edge or object boundary. In some implementations, block based coding efficiency may be improved by partitioning blocks that include multiple areas with distinct characteristics into one or more partitions, which may be rectangular, including square, partitions, corresponding to the distinct content, and encoding the partitions rather than encoding each minimum coding unit independently.

In some implementations, video coding using partitioning may include selecting a partitioning scheme from among multiple candidate partitioning schemes. For example, in some implementations, candidate partitioning schemes for a 64×64 coding unit may include rectangular size partitions ranging in sizes from 4×4 to 64×64, such as 4×4, 4×8, 8×4, 8×8, 8×16, 16×8, 16×16, 16×32, 32×16, 32×z32, 32×64, 64×32, or 64×64. In some implementations, video coding using partitioning may include a full partition search, which may include selecting a partitioning scheme by encoding the coding unit using each available candidate partitioning scheme and selecting the best scheme, such as the scheme that produces the least rate-distortion error. In some implementations of video coding using partitioning, such as offline two-pass encoding, information regarding motion between frames may be generated in a first coding pass, and may be utilized to select a partitioning scheme in a second coding pass. Techniques such as offline two-pass encoding and evaluating rate-distortion error, or other similar metrics, for each candidate partitioning scheme, may be time-consuming, and may utilize more than half of the encoding time. In some implementations, such as video conferencing or other content that includes a static background, a partitioning scheme may be selected based on the difference between previous and current source frames. In some implementations, encoding a video frame using motion-compensated partitioning may identify a partitioning scheme more efficiently than full partition searching, offline two-pass encoding, or partitioning based on inter-frame differences.

In some implementations, encoding a video frame using motion-compensated partitioning may include identifying a partitioning scheme for encoding a current block, such as block 610. In some implementations, identifying a partitioning scheme may include determining whether to encode the block as a single partition of maximum coding unit size, which may be 64×64 as shown, or to partition the block into multiple partitions, which may correspond with the sub-blocks, such as the 32×32 blocks 620 the 16×16 blocks 630, or the 8×8 blocks 640, as shown, and may include determining whether to partition into one or more smaller partitions. For example, a 64×64 block may be partitioned into four 32×32 partitions. Three of the four 32×32 partitions may be encoded as 32×32 partitions and the fourth 32×32 partition may be further partitioned into four 16×16 partitions. Three of the four 16×16 partitions may be encoded as 16×16 partitions and the fourth 16×16 partition may be further partitioned into four 8×8 partitions, each of which may be encoded as an 8×8 partition. In some implementations, identifying the partitioning scheme may include using a partitioning decision tree.

In some implementations, video coding for a current block may include identifying an optimal coding mode from multiple candidate coding modes, which may provide flexibility in handling video signals with various statistical properties, and may improve the compression efficiency. For example, a video coder may evaluate each candidate coding mode to identify the optimal coding mode, which may be, for example, the coding mode that minimizes an error metric, such as a rate-distortion cost, for the current block. In some implementations, the complexity of searching the candidate coding modes may be reduced by limiting the set of available candidate coding modes based on similarities between the current block and a corresponding prediction block. In some implementations, the complexity of searching each candidate coding mode may be reduced by performing a directed refinement mode search. For example, metrics may be generated for a limited set of candidate block sizes, such as 16×16, 8×8, and 4×4, the error metric associated with each block size may be in descending order, and additional candidate block sizes, such as 4×8 and 8×4 block sizes, may be evaluated.

In some implementations, alternating block constrained decision mode coding may include alternating between an unconstrained decision mode, wherein the set of candidate coding modes may be fully searched, and a constrained mode, wherein the set of candidate coding modes to be searched may be limited. In some implementations, the alternating may be spatial, temporal, or both spatial and temporal. Spatial alternating may include alternating between constrained and unconstrained modes among immediately adjacent, neighboring, blocks. In some implementations, spatial alternating may be vertical, horizontal, or both. For example, the alternating may be represented as a checkerboard, or chessboard, pattern. Temporal alternating may include alternating between constrained and unconstrained modes among immediately adjacent frames.

Figure 7:
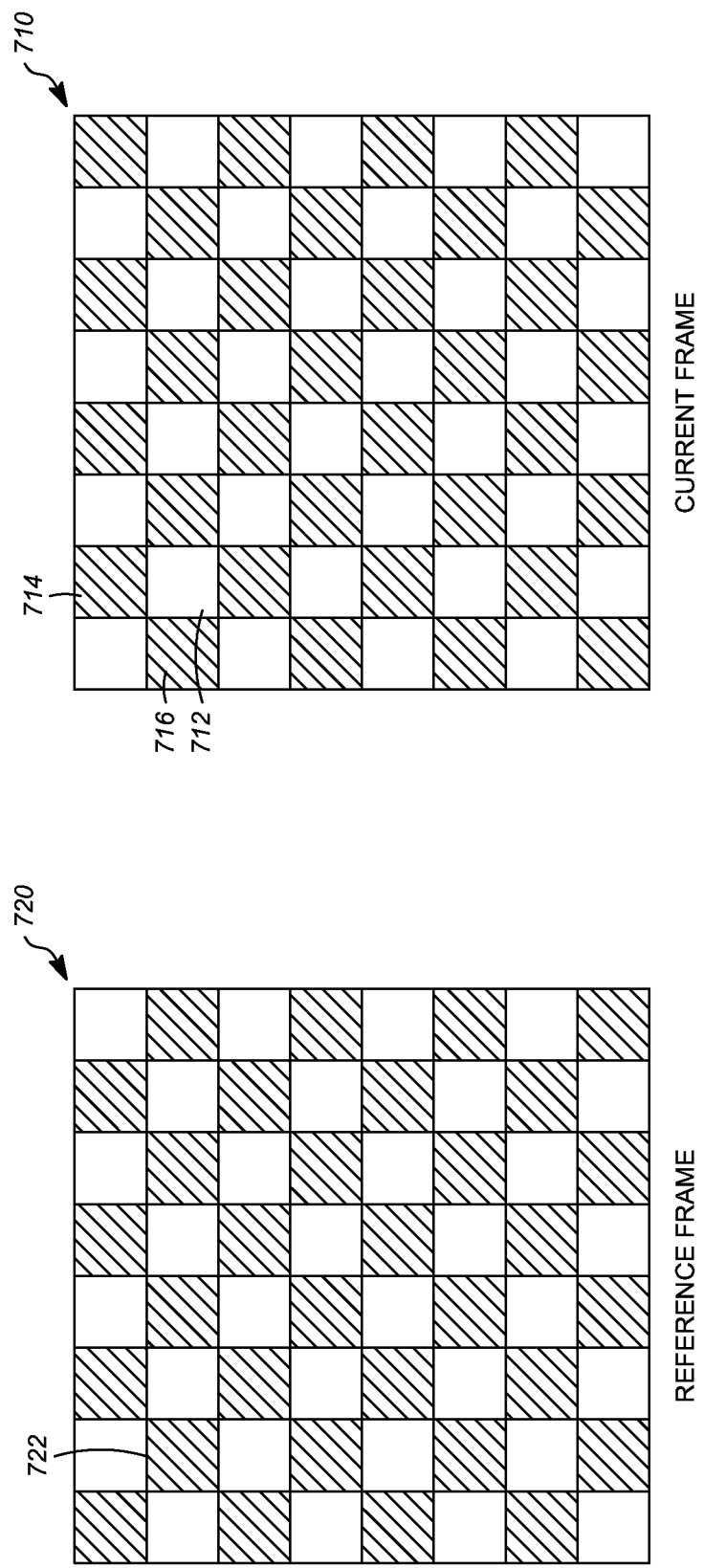
FIG. 7 is a diagram of an example of a representation of frames using spatial and temporal alternating block constrained mode video coding in accordance with implementations of this disclosure.

FIG. 7 is a diagram of an example of a representation of frames using spatial and temporal alternating block constrained mode video coding in accordance with implementations of this disclosure. In some implementations, alternating block constrained mode video coding may include alternating between coding blocks in an unconstrained coding mode and coding blocks in a constrained coding mode. For example, unconstrained coding mode blocks are shown in black and constrained coding mode blocks are shown in white. In some implementations, alternating block constrained mode video coding may include spatial alternating block constrained mode video coding, temporal alternating block constrained mode video coding, or a combination thereof. In some implementations, alternating block constrained mode video coding may include coding a current video frame. For example, FIG. 7 shows a portion of a current frame 710. Although an 8×8 portion of a current frame 810 is shown in FIG. 7, a frame may include any number of blocks and each block may include any number of pixels.

In some implementations, spatial alternating block constrained mode video coding may include determining a coding mode for a current block based on a coding mode of one or more spatially adjacent previously coded blocks. For example, as shown in FIG. 7, the current frame 710 may include a current block 712, a first neighbor block 714, and a second neighbor block 716, and a coding mode for the current block 712 may be identified based on a coding mode of the immediately adjacent blocks 714/716. The neighbor blocks 714/716 may be spatially immediately adjacent the current block 712 in the current frame 710. For example, as shown, the first neighbor block 714 may be immediately above the current block 712, and the second neighbor block 716 may be immediately to the left of the current block 712.

In some implementations, temporal alternating block constrained mode video coding may include determining a coding mode for a current block based on a coding mode of one or more spatially adjacent previously coded blocks and one or more temporally adjacent spatially concurrent previously coded blocks. For example, as shown in FIG. 7, a reference frame 720 may include a reference block 722. The reference frame 720 may be spatially adjacent to the current frame 710, and the reference block 722 in the reference frame 720, may be spatially concurrent with the current block 712.

Figure 8:
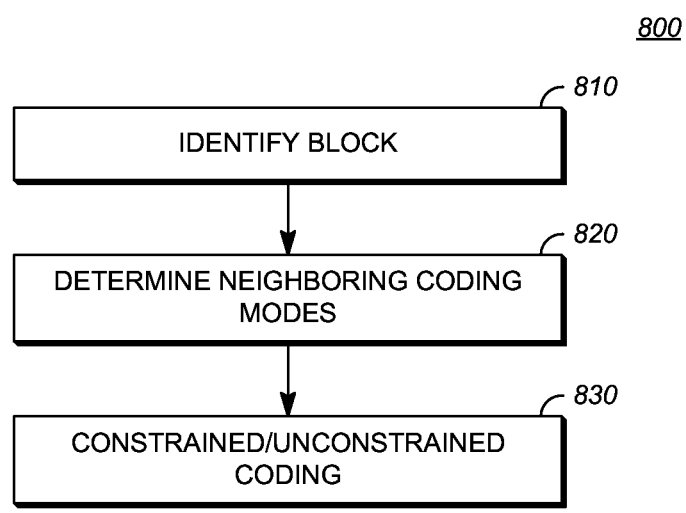
FIG. 8 is a diagram of an example of a method of spatial and temporal alternating block constrained mode video coding in accordance with implementations of this disclosure.

FIG. 8 is a diagram of an example of a method of spatial and temporal alternating block constrained mode video coding in accordance with implementations of this disclosure. In some implementations, an encoder, such as the encoder 400 shown in FIG. 4, may receive an input video stream, such as the input video stream 402 shown in FIG. 4, may encode the input video stream, such as the encoding shown in FIG. 4, and may output an encoded video stream, such as the compressed bitstream 404 shown in FIG. 4. In some implementations, encoding the video stream may include spatial and temporal alternating block constrained mode video coding 800. In some implementations, spatial and temporal alternating block constrained mode video coding 800 may include identifying a current block at 810, determining neighboring coding modes at 820, constrained or unconstrained coding at 830, or a combination thereof.

In some implementations, a current block may be identified at 810. In some implementations, a current frame of the input, or source, video stream may include multiple N×N blocks, such as 16×16 blocks, and a block from the current frame may be identified as the current block. For example, a frame, such as the frame 710 shown in FIG. 7, may be identified as the current frame, and a block, such as the block 712 shown in FIG. 7, may be identified as the current block. In some implementations, each block from the source frame may be coded on a block-by-block basis. In some implementations, block based coding may include encoding a block using hierarchical coding, such as quad-tree coding. For example, the current block may be a 64×64 block, and encoding the current block may include encoding one or more sub-blocks, such as one or more of the blocks 610-650 shown in FIG. 6.

In some implementations, neighboring coding modes may be identified at 820. In some implementations, identifying the neighboring coding modes may include identifying the coding mode used for encoding the neighboring blocks, identifying the coding decision mode used for the neighboring blocks, or both. In some implementations, a coder, such as the encoder 400 shown in FIG. 4, may determine whether the blocks neighboring the current block, which may be previously coded bocks, were coded as constrained decision mode blocks or unconstrained decision mode blocks. In some implementations, the coder may store a bit, or flag, indicating whether the previously coded block was coded as a constrained decision mode block or an unconstrained decision mode block, and identifying the neighboring coding modes may include evaluating the flag.

In some implementations, constrained or unconstrained decision mode coding may be performed at 830. In some implementations, performing constrained or unconstrained decision mode coding may include determining, based on the coding decision mode for the neighboring blocks, whether to perform constrained decision mode coding or unconstrained decision mode coding. For example, the block immediately above the current block in the current frame, the block immediately to the left of the current block in the current frame, or both, may be unconstrained decision mode coded blocks, and the current block may be coded using constrained decision mode coding. In another example, the block immediately above the current block in the current frame, the block immediately to the left of the current block in the current frame, or both, may be constrained decision mode coded blocks, and the current block may be coded using unconstrained decision mode coding.

In some implementations, unconstrained decision mode coding may include generating a motion compensated reference block by identifying a reference block from a reference frame, and filtering the reference block using a spatial filter selected from a set of candidate spatial filters. In some implementations, the selected spatial filter may be identified using a full search, which may be a rate-distortion optimization mode search. In some implementations, a full search may include applying each candidate spatial filter from the set of candidate spatial filters to the reference block to generate a set of candidate motion compensated reference blocks, determining a residual for each candidate motion compensated reference block, and selecting the spatial filter associated with the residual having the minimal prediction error. In some implementations, unconstrained decision mode coding may include a partial full search. For example, a rate-distortion optimization mode search may be terminated, such that evaluation of one or more of the candidate search types may be omitted, based on metrics indicating similarities between the current block and the prediction block.

In some implementations, one or more reference block may be unavailable unconstrained decision mode coding may include using available reference blocks. For example, the current block may be the top left block of the frame, a reference block above the current block in the current frame may be unavailable, a reference block to the left of the current block in the current frame may be unavailable, and unconstrained decision mode coding may include using the prediction mode from a collocated block from the previous frame. In another example, the current block may be the a block from the left most column, a reference block to the left of the current block in the current frame may be unavailable, and unconstrained decision mode coding may include using the prediction mode from a reference block above the current block in the current frame and the prediction mode from a collocated block from the previous frame. In another example, the current block may be the a block from the top most row of the current frame, a reference block above the current block in the current frame may be unavailable, and unconstrained decision mode coding may include using the prediction mode from a reference block to the left of the current block in the current frame and the prediction mode from a collocated block from the previous frame.

In some implementations, constrained decision mode coding may include identifying a prediction filter, which may be a spatial filter, based on the prediction filters used for encoding the neighboring blocks. For example, constrained decision mode coding may include determining whether the prediction filters used for encoding the neighboring blocks match. In some implementations, the selected prediction filter type may match the neighboring blocks. For example, the set of candidate spatial filters may include N filter types, the neighboring block above the current block may be encoded using the Nth filter type, the neighboring block to the left of the current block may be encoded using the Nth filter type, the filter search may be omitted, and the current block may be encoded using the Nth filter type. In some implementations, the neighboring filter types may differ, and the filter may be selected using a full search or a reduced candidate set search. For example, the set of candidate spatial filters may include N filter types, the neighboring block above the current block may be encoded using the first filter type, the neighboring block to the left of the current block may be encoded using the second filter type, and a reduced candidate set search may include searching using the first filter type and the second filter type. In some implementations, a reduced candidate set search may include searching one or more similar filter types. For example, the set of candidate spatial filters may include N filter types, the neighboring block above the current block may be encoded using the first filter type, the neighboring block to the left of the current block may be encoded using the second filter type, the candidate set may include a third filter type that is similar to the first filter type and the second filter type, and a reduced candidate set search may include searching using the first filter type, the second filter type, and the third filter type.

In some implementations, unconstrained decision mode coding may include a rate-distortion optimization search. For example, the rate-distortion optimization search may include a block size search to identify a set of sub-blocks to code as distinct units within the current block. In some implementations, a block size search may include evaluating a set of candidate block sizes to identify a set of sub-blocks, within the current block, that may each be coded as a distinct unit. For example, the current block may be a 64×64 block, such as the 64×64 block 610 shown in FIG. 6, and a set of candidate block sizes, such as the square blocks 620-650, or rectangular blocks. For example, 4×4, 4×8, 8×4, 8×8, 8×16, 16×8, 16×16, 16×32, 32×16, 32×z32, 32×64, 64×32, and 64×64 blocks, may be searched. In some implementations, unconstrained decision mode coding may include a directed refinement mode block size search based on the neighboring blocks block sizes. For example, the block above the current block may use an 8×16 partition size, the block to the left of the current block may use a 16×16 partition size, and unconstrained decision mode coding may include searching similarly sized units, such as 8×8, 16×8, 8×16, 16×16 partition sizes.

In some implementations, constrained decision mode coding may include a contextual rate-distortion optimization search. In some implementations, a contextual rate-distortion optimization search may include identifying a minimum coding block size and a maximum coding block size from among the neighboring block spatially above the current block in the current frame, the neighboring block spatially to the left of the current block in the current frame, and the neighboring block spatially concurrent with the current block in a temporally adjacent previously coded frame. In some implementations, a contextual rate-distortion optimization search may include searching a reduced set of candidate block sizes. For example, candidate block sizes smaller than the minimum coding block size from the neighboring blocks and candidate block sizes larger than the maximum coding block size from the neighboring blocks may be omitted from the search.

Other implementations of the diagrams of alternating block constrained mode video coding as shown in FIGS. 7-8 are available. In implementations, additional elements of alternating block constrained mode video coding can be added, certain elements can be combined, and/or certain elements can be removed.

The words "example" or "exemplary" are used herein to mean serving as an example, instance, or illustration. Any aspect or design described herein as "example" or "exemplary" not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using one or more of the devices shown in FIG. 1.

Further, for simplicity of explanation, although the figures and descriptions herein may include sequences or series of steps or stages, elements of the methods disclosed herein can occur in various orders and/or concurrently. Additionally, elements of the methods disclosed herein may occur with other elements not explicitly presented and described herein. Furthermore, not all elements of the methods described herein may be required to implement a method in accordance with the disclosed subject matter.

The implementations of the transmitting station 100A and/or the receiving station 100B (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting station 100A and the receiving station 100B do not necessarily have to be implemented in the same manner.

Further, in one implementation, for example, the transmitting station 100A or the receiving station 100B can be implemented using a general purpose computer or general purpose/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

The transmitting station 100A and receiving station 100B can, for example, be implemented on computers in a real-time video system. Alternatively, the transmitting station 100A can be implemented on a server and the receiving station 100B can be implemented on a device separate from the server, such as a hand-held communications device. In this instance, the transmitting station 100A can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 100A. Other suitable transmitting station 100A and receiving station 100B implementation schemes are available. For example, the receiving station 100B can be a generally stationary personal computer rather than a portable communications device and/or a device including an encoder 400 may also include a decoder 500.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A method comprising:
identifying a current block of a current frame of an input video stream;
generating, by a processor in response to instructions stored on a non-transitory computer readable medium, an encoded block by encoding the current block using alternating block constrained decision mode coding, wherein alternating block constrained decision mode coding includes encoding the current block as a constrained decision mode coded block on a condition that a previously coded immediately adjacent block is an unconstrained decision mode coded block and on a condition that a spatially concurrent block of the current block from a temporally immediately adjacent previously coded frame is an unconstrained decision mode coded block;
including the encoded block in an output bitstream; and
transmitting or storing the output bitstream,
wherein a coding block size used for encoding the current block is limited by a first value and a second value, the first value representing a smallest coding block size among the previously coded immediately adjacent block and the spatially concurrent block, the second value representing a largest coding block size among the previously coded immediately adjacent block and the spatially concurrent block.

2. The method of claim 1, wherein alternating block constrained decision mode coding includes encoding the current block as an unconstrained decision mode coded block on a condition that the previously coded immediately adjacent block is a constrained decision mode coded block and on a condition that the spatially concurrent block is a constrained decision mode coded block.

3. The method of claim 1, wherein the previously coded immediately adjacent block is a previously coded block spatially immediately to the left of the current block in the current frame.

4. The method of claim 1, wherein the previously coded immediately adjacent block is a previously coded block spatially immediately above the current block in the current frame.

5. The method of claim 1, wherein the previously coded immediately adjacent block is a first previously coded immediately adjacent block, and wherein alternating block constrained decision mode coding includes encoding the current block as a constrained decision mode coded block on a condition that a second previously coded immediately adjacent block is an unconstrained decision mode coded block.

6. The method of claim 5, wherein the second previously coded immediately adjacent block is a previously coded block spatially immediately above the current block in the current frame, and the first previously coded immediately adjacent block is a previously coded block spatially immediately to the left of the current block in the current frame.

7. The method of claim 5, wherein encoding the current block as a constrained decision mode coded block includes:
identifying a first prediction filter used for coding the first previously coded immediately adjacent block;
identifying a second prediction filter used for coding the second previously coded immediately adjacent block;
on a condition that the first prediction filter matches the second prediction filter, coding the current block using the first prediction filter; and
on a condition that the first prediction filter differs from the second prediction filter, identifying a selected prediction filter from a set of candidate prediction filters and coding the current block using the selected prediction filter.

8. The method of claim 5, wherein
the first value represents a smallest coding block size among the first previously coded immediately adjacent block, the second previously coded immediately adjacent block, and the spatially concurrent block,
wherein the second value represents a largest coding block size among the first previously coded immediately adjacent block, the second previously coded immediately adjacent block, and the spatially concurrent block.

9. A method comprising:
identifying a current block of a current frame of an input video stream;
generating, by a processor in response to instructions stored on a non-transitory computer readable medium, an encoded block by encoding the current block using alternating block constrained decision mode coding, wherein alternating block constrained decision mode coding includes encoding the current block as a constrained decision mode coded block on a condition that a first previously coded immediately adjacent block is an unconstrained decision mode coded block, a second previously coded immediately adjacent block is an unconstrained decision mode coded block, and a third previously coded block is an unconstrained decision mode coded block, wherein the third previously coded block is spatially concurrent with the current block and the third previously coded block is from a temporally immediately adjacent previously coded frame;
including the encoded block in an output bitstream; and
transmitting or storing the output bitstream,
wherein a coding block size used for encoding the current block is limited by a first value and a second value, the first value representing a smallest coding block size among the previously coded immediately adjacent block and the spatially concurrent block, the second value representing a largest coding block size among the previously coded immediately adjacent block and the spatially concurrent block.

10. The method of claim 9, wherein alternating block constrained decision mode coding includes encoding the current block as an unconstrained decision mode coded block on a condition that the first previously coded immediately adjacent block is a constrained decision mode coded block, the second previously coded immediately adjacent block is a constrained decision mode coded block, and the third previously coded block is a constrained decision mode coded block.

11. The method of claim 9, wherein the first previously coded immediately adjacent block is a previously coded block spatially immediately to the left of the current block in the current frame.

12. The method of claim 9, wherein the second previously coded immediately adjacent block is a previously coded block spatially immediately above the current block in the current frame.

13. The method of claim 9, wherein encoding the current block as a constrained decision mode coded block includes:
identifying a first prediction filter used for coding the first previously coded immediately adjacent block;
identifying a second prediction filter used for coding the second previously coded immediately adjacent block;
on a condition that the first prediction filter matches the second prediction filter, coding the current block using the first prediction filter; and
on a condition that the first prediction filter differs from the second prediction filter, identifying a selected prediction filter from a set of candidate prediction filters and coding the current block using the selected prediction filter.

14. A method comprising:
identifying a current block of a current frame of an input video stream;
generating, by a processor in response to instructions stored on a non-transitory computer readable medium, an encoded block by encoding the current block using alternating block constrained decision mode coding, wherein alternating block constrained decision mode coding includes:
encoding the current block as a constrained decision mode coded block on a condition that, a first previously coded immediately adjacent block is an unconstrained decision mode coded block, wherein the first previously coded immediately adjacent block is a previously coded block spatially immediately to the left of the current block in the current frame, a second previously coded immediately adjacent block is an unconstrained decision mode coded block, wherein the second previously coded immediately adjacent block is a previously coded block spatially immediately above the current block in the current frame, and a third previously coded immediately adjacent block is an unconstrained decision mode coded block, wherein the third previously coded immediately adjacent block is spatially concurrent with the current block and the third previously coded immediately adjacent block is from a temporally immediately adjacent previously coded frame;
encoding the current block using a prediction filter identified based on the first previously coded immediately adjacent block and the second previously coded immediately adjacent block; and
encoding the current block using a coding block size range identified based on the first previously coded immediately adjacent block, the second previously coded immediately adjacent block, and the third previously coded immediately adjacent block, including the encoded block in an output bitstream; and transmitting or storing the output bitstream.

15. The method of claim 14, wherein alternating block constrained decision mode coding includes encoding the current block as an unconstrained decision mode coded block on a condition that:

the first previously coded immediately adjacent block is a constrained decision mode coded block;

the second previously coded immediately adjacent block is a constrained decision mode coded block; and the third previously coded immediately adjacent block is a constrained decision mode coded block.

16. The method of claim 14, wherein encoding the current block using the prediction filter includes:

identifying a first candidate prediction filter used for coding the first previously coded immediately adjacent block;

identifying a second candidate prediction filter used for coding the second previously coded immediately adjacent block;

on a condition that the first candidate prediction filter matches the second candidate prediction filter, selecting the first candidate prediction filter as the prediction filter; and on a condition that the first candidate prediction filter differs from the second candidate prediction filter, selecting the prediction filter from a set of available prediction filters.

17. The method of claim 14, wherein encoding the current block using the coding block size range includes:

identifying a minimum coding block size, wherein the minimum coding block size is the smallest coding block size among the first previously coded immediately adjacent block, the second previously coded immediately adjacent block, and the third previously coded immediately adjacent block;

identifying a maximum coding block size, wherein the maximum coding block size is the largest coding block size among the first previously coded immediately adjacent block, the second previously coded immediately adjacent block, and the third previously coded immediately adjacent block; and selecting the minimum coding block size as a lower limit of the coding block size range and the maximum coding block size as an upper limit of the coding block size range.

* * * * *